US008041130B2

(12) United States Patent
Lee et al.

(10) Patent No.: US 8,041,130 B2
(45) Date of Patent: Oct. 18, 2011

(54) COMPRESSIVE OVERDRIVE CIRCUIT AND ASSOCIATED METHOD

(75) Inventors: Wei-Kuo Lee, Hsin-Chu Hsien (TW); Shih-Chang Lai, Hsin-Chu (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 890 days.

(21) Appl. No.: 11/971,912

(22) Filed: Jan. 10, 2008

(65) Prior Publication Data

US 2008/0212875 A1 Sep. 4, 2008

Related U.S. Application Data

(60) Provisional application No. 60/884,223, filed on Jan. 10, 2007.

(51) Int. Cl.
*G06K 9/36* (2006.01)
*G06T 9/00* (2006.01)

(52) U.S. Cl. ......... 382/232; 382/166; 345/204; 345/555

(58) Field of Classification Search .................. 382/232, 382/236, 233, 166; 345/204, 555
See application file for complete search history.

(56) References Cited

U.S. PATENT DOCUMENTS

| | | | | |
|---|---|---|---|---|
| 2005/0162566 | A1* | 7/2005 | Chuang et al. | 348/714 |
| 2005/0200631 | A1* | 9/2005 | Pan et al. | 345/600 |
| 2005/0225522 | A1* | 10/2005 | Wu et al. | 345/87 |
| 2005/0237316 | A1* | 10/2005 | Huang et al. | 345/204 |
| 2006/0152501 | A1* | 7/2006 | Furihata et al. | 345/204 |
| 2006/0164365 | A1* | 7/2006 | Huang et al. | 345/98 |

FOREIGN PATENT DOCUMENTS

CN 1804987 A 7/2006

OTHER PUBLICATIONS

Someya et al. "The Suppression of Noise on a Dithering Image in LCD Overdrive." IEEE Transactions on Consumer Electronics, vol. 52, No. 4, Nov. 2006, pp. 1325-1332.*

"Neighboring Pixels Based Low Complexity Predictive Vector Quantization Algorithms for Image Coding", Yang et al, Acta Electronica Sinica,vol. 31 No. 5, p. 707-710, May 2003.

* cited by examiner

*Primary Examiner* — Jon Chang
(74) *Attorney, Agent, or Firm* — Winston Hsu; Scott Margo

(57) ABSTRACT

A compressive overdrive circuit includes: a compression unit for compressing a current frame to generate compressed data for buffering, where the compressed data comprises pixel values of a plurality of non-encoded pixels and a plurality of index values associated with the non-encoded pixels; and a decompression unit for decompressing according to the pixel values of the non-encoded pixels and the index values to generate data of a previous frame. The overdrive circuit performs overdrive processing according to the current frame and the previous frame.

16 Claims, 7 Drawing Sheets

| Bit | 5 | 4 | 3 | 2 | 1 | 0 |
|---|---|---|---|---|---|---|
| Content | Most resembling neighboring pixel | | Secondary resembling neighboring pixel | | Blending value | |

FIG. 5

COMPRESSIVE OVERDRIVE CIRCUIT AND ASSOCIATED METHOD

CROSS REFERENCE TO RELATED APPLICATIONS

This application claims the benefit of U.S. Provisional Application No. 60/884,223, filed on Jan. 10, 2007 and entitled "Overdrive Compression Method", the contents of which are incorporated herein by reference.

BACKGROUND OF THE INVENTION

1. Field of the Invention

The present invention relates to image processing of an LCD (liquid crystal display), and more particularly, to a compressive overdrive circuit and associated method.

2. Description of the Prior Art

An LCD has the advantages of being a small size and light-weight, therefore, LCDs are gradually substituting for conventional cathode ray tube displays. In addition, as the frequency of display drive signals increases, liquid crystal molecules can not quickly rotate to a desired specific angle with changes in the drive signal. The image blur problem is serious when a difference of the pixel values between continuous frames is large.

FIG. 1 shows a prior art overdrive circuit 10. Each pixel, $R_N$, $G_N$, and $B_N$ respectively represents the pixel values of a current frame $F_N$ in the R/G/B color domain. $R_{N-1}$, $G_{N-1}$, and $B_{N-1}$ respectively represent the pixel values of a previous frame $F_{N-1}$ in the R/G/B color domain. The overdrive circuit 10 utilizes a look-up table (LUT) to output color signals $R_{OUT}$, $G_{OUT}$, and $B_{OUT}$ to compensate rotating speed of the liquid crystal molecules, so as to improve display quality.

However, the prior art stores all pixel values of the previous frame for overdrive. As LCD resolution increases, more DRAM is required for overdrive processing and thus cost increases.

SUMMARY OF THE INVENTION

It is therefore one of the objectives of the claimed invention to provide a compressive overdrive circuit and associated method to solve the above-mentioned problems. When the buffer is limited, the present invention may still support the overdrive processing for high display resolution to improve display quality.

The present invention provides a compressive overdrive circuit, comprising a compression unit, for compressing a current frame to generate compressed data for buffering, where the compressed data comprises pixel values of a plurality of non-encoded pixels and a plurality of index values associated with the non-encoded pixels, and a decompression unit, for decompressing according to the pixel values of the non-encoded pixels and the index values to generate data of a previous frame. Therefore, the overdrive circuit performs overdrive processing according to the current frame and the previous frame with limited buffer for high display resolution.

The present invention also provides a method of compressive overdrive, comprising compressing a current frame to generate compressed data for buffering, where the compressed data comprises pixel values of a plurality of non-encoded pixels and a plurality of index values associated with the non-encoded pixels, decompressing according to the pixel values of the non-encoded pixels and the index values to generate data of a previous frame, and performing overdrive processing according to the pixel values of the current frame and the previous frame.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 illustrates the compressed data format of the encoded pixel shown in FIG. 4 according to an embodiment of the present invention.

DETAILED DESCRIPTION

A compressive overdrive circuit and associated method provided by the present invention can be implemented in an LCD display and thereby can perform overdrive processing for the LCD display panel to improve display quality.

A volatile memory, e.g. a dynamic random access memory (DRAM), static random access memory (SRAM) can be utilized as a buffer in the embodiments.

Figure 1:
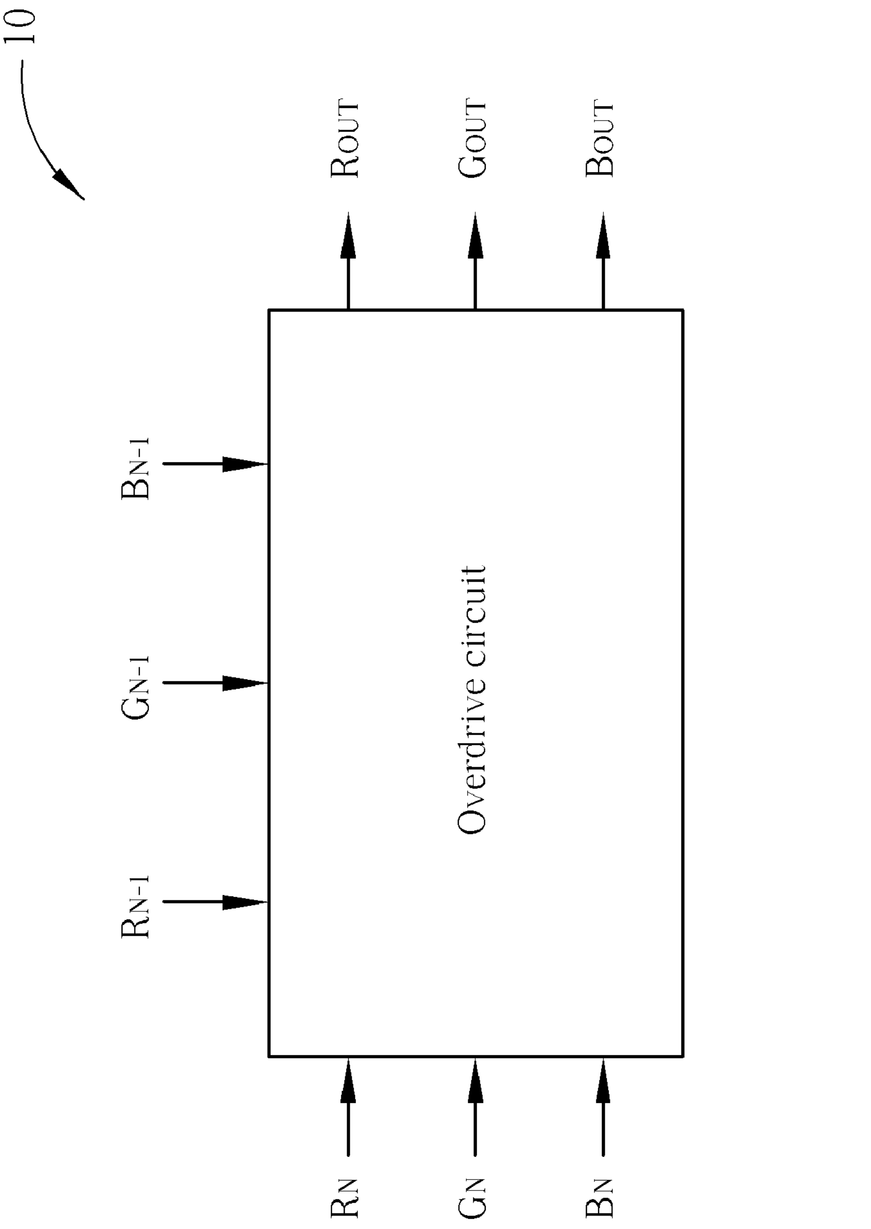
FIG. 1 PRIOR ART
FIG. 1 shows a prior art overdrive circuit.
Figure 2:
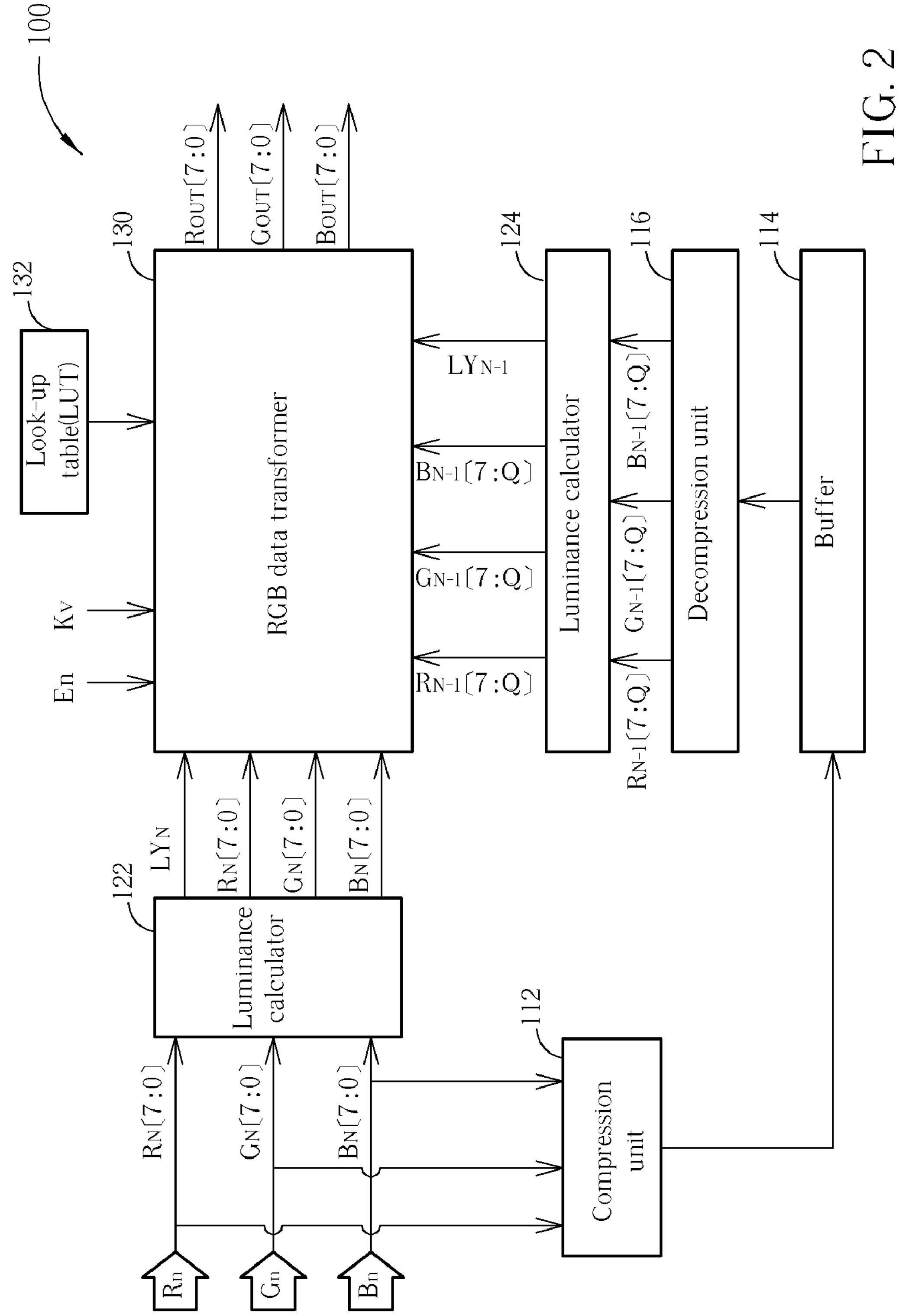
FIG. 2 shows the compressive overdrive circuit according to one embodiment of the present invention.

FIG. 2 shows the compressive overdrive circuit 100 according to one embodiment of the present invention. The compressive overdrive circuit 100 comprises a compression unit 112, a buffer 114, a decompression unit 116, two luminance calculators 122 and 124, an RGB data transformer 130 and a look-up table (LUT) 132. The signals $R_n$, $G_n$, and $B_n$ in the R/G/B color domain represent signals $\{R_0, R_1, \ldots, R_N\}$, $\{G_0, G_1, \ldots, G_N\}$, and $\{B_0, B_1, \ldots, B_N\}$ of a series of frame $\{F_0, F_1, \ldots, F_N\}$.

Figure 3:
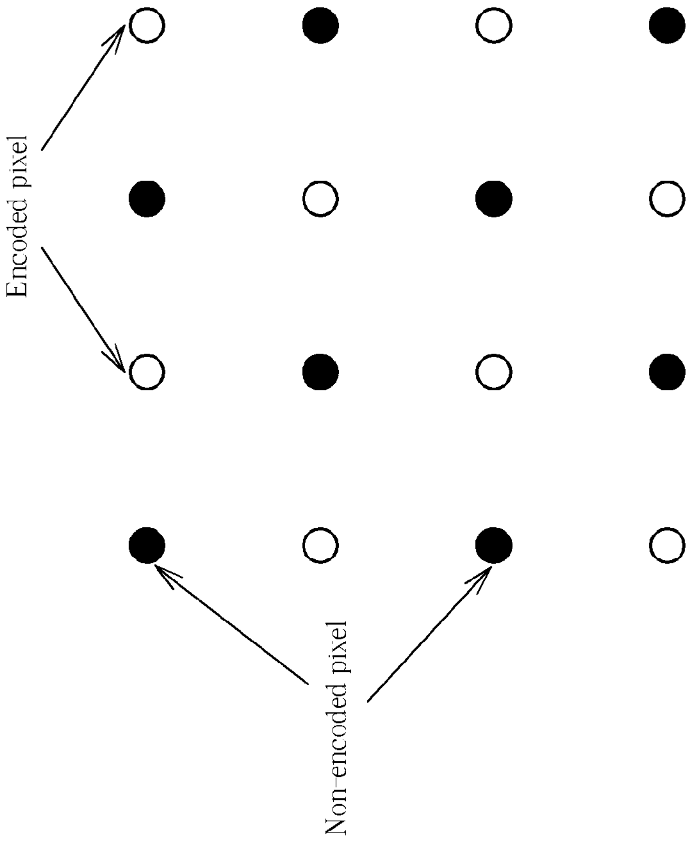
FIG. 3 illustrates pixels processed by the overdrive circuit shown in FIG. 2 and the neighboring pixels.

In this embodiment, the compression unit 112 compresses a plurality of pixel values of a current frame $F_N$ to store the compressed data into the buffer 114, and then the compressed data can be read by the decompression unit 116 later, wherein the most significant bit of the embodiment is determined as a bit [7:Q] and 'Q' is an integer no larger than 7. As shown in FIG. 3, the pixels processed by the overdrive circuit 100 comprise encoded pixels and non-encoded pixels, and are represented respectively as hollow circles and concrete circles. The compressed data comprises pixel values of the non-encoded pixels, index values associated with the non-encoded pixels and blending value. The buffer 114 buffers the index values, the blending value, and associated information as the encoded data for the encoded pixels. Accordingly, the present invention can save the storage capacity of the buffer 114 and access bandwidth. Persons skilled in the art can modify the structure pattern of the non-encoded pixels and the encoded pixels, for example, ratio, amount and/or arrangement.

As shown in FIG. 2, the decompression unit 116 decompresses the buffered compressed data according to the blending value to output the pixel value of the previous frame $F_{N-1}$, including the most significant bits $R_{N-1}$[7:Q], $G_{N-1}$[7:Q], and $B_{N-1}$[7:Q], via the R/G/B color channels respectively. In this embodiment, the encoded data of each encoded pixel comprises a blending value and two index values, and thereby the decompression unit 116 blends the pixel values of the non-encoded pixel represented by the two index values to generate the pixel values of the encoded pixels according to the blending value, in order to generate the pixel data of the previous frame $F_{N-1}$. The luminance calculators 122 and 124 calculate luminance $LY_N$ and $LY_{N-1}$ of two continuous frames $F_N$ and $F_{N-1}$ according to the pixel values of the frame $F_N$ and $F_{N-1}$ respectively for the RGB data transformer 130 to perform the overdrive processing. Accordingly, the RGB data transformer 130 performs the overdrive processing according to the look-up table 132, luminance $LY_N$ and $LY_{N-1}$, the pixel values of the current frame $F_N$, and the most significant bits [7:Q] of the pixel values of the previous frame $F_{N-1}$.

Figure 4:
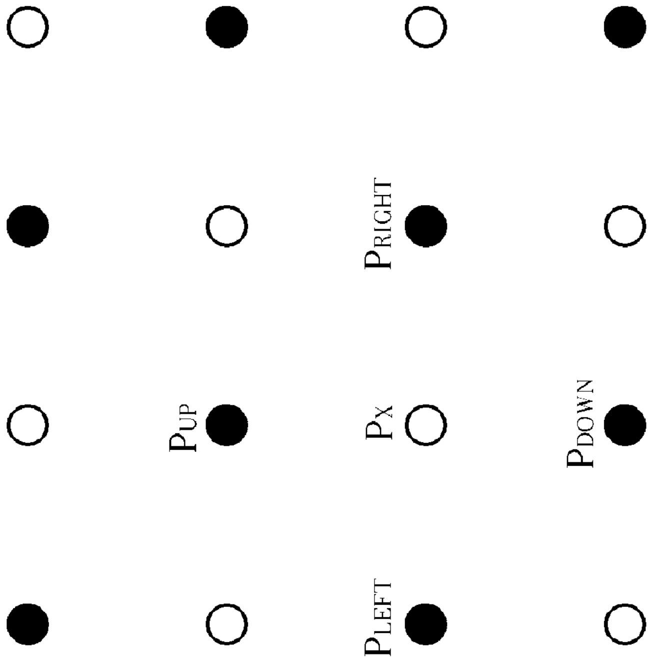
FIG. 4 illustrates the encoded pixel and neighboring pixels processed by the compression unit shown in FIG. 2.

FIG. 4 shows the encoded pixel $P_x$ and $P_x$'s neighboring pixels $P_{UP}$, $P_{DOWN}$, $P_{LEFT}$, and $P_{RIGHT}$ to be processed by the compression unit 112 shown in FIG. 2. The neighboring pixels $P_{UP}$, $P_{DOWN}$, $P_{LEFT}$, and $P_{RIGHT}$ are defined as index values 0,3, 1, and 2 respectively. In this embodiment, the compressed data generated by the compression unit 112 comprises one or more of the index values. Persons skilled in the art can modify the arrangement pattern of the neighboring pixels for the encoded pixel $P_x$.

FIG. 5 shows a compressed data format of the encoded pixel $P_x$ shown in FIG. 4 according to an embodiment of the present invention. The compression unit 112 outputs six bits shown in FIG. 5 to compress the pixel value of the encoded pixel $P_x$. The left two bits represent pixel location P1, and the middle two bits represent pixel location P2, which can be represented by index values 0, 1,2, or 3 in binary. The right two bits represent a blending parameter associated with the encoded pixel $P_x$. The pixel location P1 is a most resembling pixel neighboring to the encoded pixel $P_x$, and the pixel P2 is a secondary resembling pixel neighboring to the encoded pixel $P_x$. As a result, the decompression unit 116 can estimate the pixel value of the encoded pixel $P_x$ by blending the pixel values of the pixel P1 and the pixel P2 according to the blending parameter.

Figure 6:
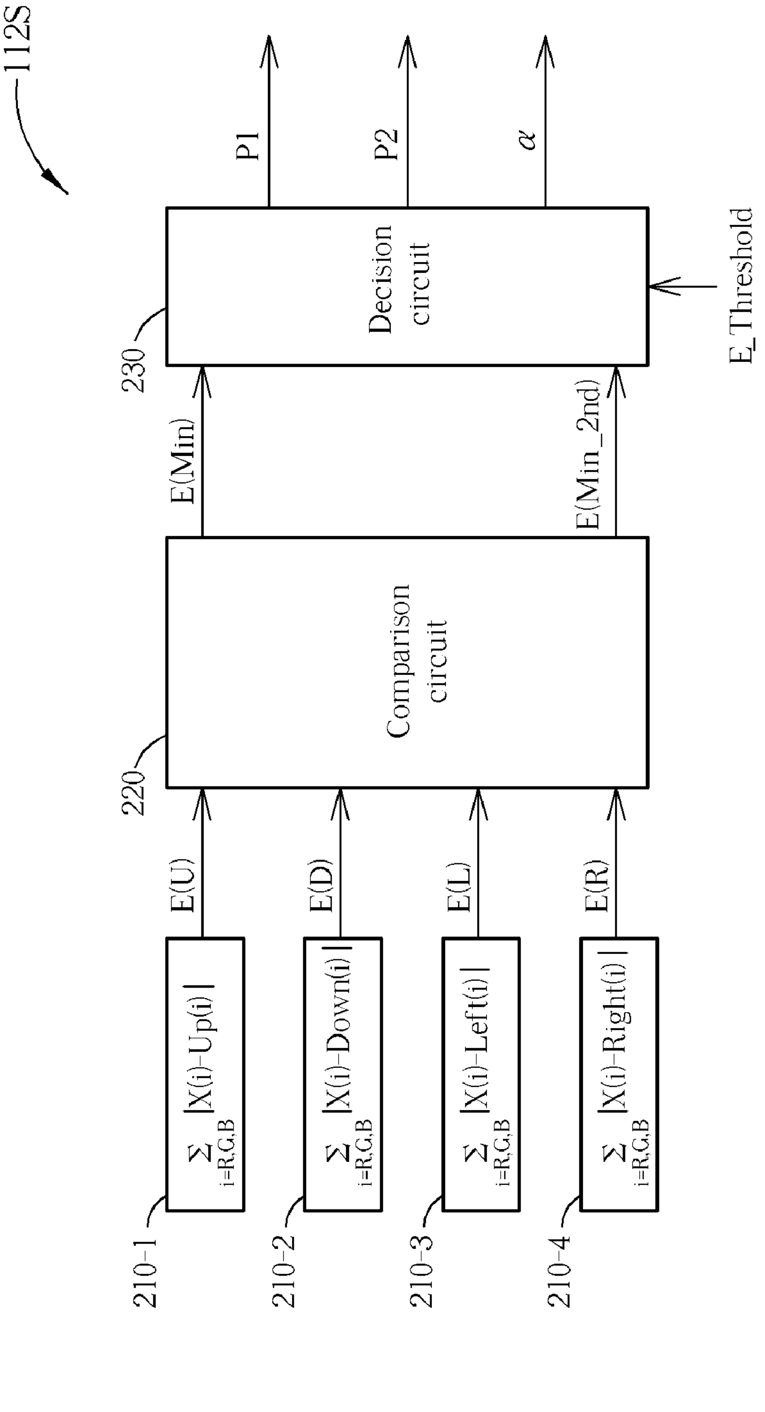
FIG. 6 is a block diagram illustrating the compressed data generator shown in FIG. 2.

FIG. 6 shows a compressed data generator 112S which can be applied in the compression unit 112 to select the pixel locations P1 and P2 according to an embodiment of the present invention. The compressed data generator 112S comprises error calculators 210-1, 210-2, 210-3, and 210-4, a comparison circuit 220 and a decision circuit 230. The compressed data generator 112S of the compression unit 112 utilizes the error calculators 210-1, 210-2, 210-3, and 210-4 to calculate errors E(U), E(D), E(L), and E(R) corresponding to the neighboring pixels $P_{UP}$, $P_{DOWN}$, $P_{LEFT}$, and $P_{RIGHT}$ respectively:

$$E(U)=|X(R)-\mathrm{Up}(R)|+|X(G)-\mathrm{Up}(G)|+|X(B)-\mathrm{Up}(B)|,$$

$$E(D)=|X(R)-\mathrm{Down}(R)|+|X(G)-\mathrm{Down}(G)|+|X(B)-\mathrm{Down}(B)|,$$

$$E(L)=|X(R)-\mathrm{Left}(R)|+|X(G)-\mathrm{Left}(G)|+|X(B)-\mathrm{Left}(B)|$$

$$E(R)=|X(R)-\mathrm{Right}(R)|+|X(G)-\mathrm{Right}(G)|+|X(B)-\mathrm{Right}(B)|,$$

wherein X(i) (i=R, G, and B) represents red, green, and blue components of the encoded pixel $P_x$ respectively, and Up(i), Down(i), Left(i), Right(i) (i=R, G, and B) represent the red, green, blue components of the pixel value of the neighboring pixels $P_{UP}$, $P_{DOWN}$, $P_{LEFT}$, and $P_{RIGHT}$.

The compressed data generator 112S of the compression unit 112 utilizes the comparison circuit 220 to determine a minimum error E(Min) and a second minimum error E(Min__2nd) of the errors E(U), E(D), E(L), and E(R). In this embodiment, the comparison circuit 220 outputs the minimum error E(Min), the second minimum error E(Min__2nd) and two associated index values to the decision circuit 230. The two index values are selected from the index values 0,3, 1 and 2 representing the neighboring pixels $P_{UP}$, $P_{DOWN}$, $P_{LEFT}$, and $P_{RIGHT}$.

The compressed data generator 112S utilizes the decision circuit 230 to determine the pixel locations P1 and P2 according to the errors E(U), E(D), E(L), and E(R). Preferably, the decision circuit 230 determines the pixel P1 as a most resembling pixel corresponding to the minimum error E(Min). When (E(Min__2nd)-E(Min)) is not bigger than a threshold value E_Threshold, the decision circuit 230 determines the pixel P2 as a secondary resembling pixel corresponding to the second minimum error E(Min__2nd). However, when (E(Min__2nd)-E(Min)) is bigger than the threshold value E_Threshold, the decision circuit 230 determines that the pixel P2 is also the most resembling pixel corresponding to the minimum error E(Min). When the difference between the E(Min__2nd) and E(Min) is quite big, the resemblance of the secondary resembling pixel to the encoded pixel $P_x$ is low, and therefore the secondary resembling pixel location P2 is preferably discarded.

The decision circuit 230 decides the blending parameter for the encoded pixel $P_x$ according to the difference (E(Min__2nd)-E(Min)). For example, when the difference (E(Min__2nd)-E(Min)) is smaller, the blending parameter is bigger. The decision circuit 230 can directly output a blending value α as the blending parameter, or output a blending index value to indicate the blending value.

The pixel values P1 (R), P1 (G), and P1 (B) represent the red, green, and blue components of the pixel values of the pixel P1 respectively, and the pixel values P2(R), P2(G), and P2(B) represent the red, green, and blue components of the pixel values of the pixel P2 respectively. In this embodiment, the right two bits of the six bits shown in FIG. 5 may indicate a numerator of the blending value α, and the blending value α has a common denominator, e.g. 8, wherein the blending index value represented by the above-mentioned right two bits is 0, 1,2 or 3, the blending value α is 7/8, 6/8, 5/8 or 4/8.

Accordingly, the decompression unit 116 reconstructs the red, green, blue components of the encoded pixel $P_x$ according to the following equations:

$$X'(R)=P1(R)*\alpha+P2(R)*(1-\alpha),$$

$$X'(G)=P1(G)*\alpha+P2(G)*(1-\alpha), \text{ and}$$

$$X'(B)=P1(B)*\alpha+P2(B)*(1-\alpha).$$

The pixel value X'(i) (I=R,G,B) of the decompressed encoded pixel $P_x$ is provided to the luminance calculator 124 and the RGB data transformer 130.

Figure 7:
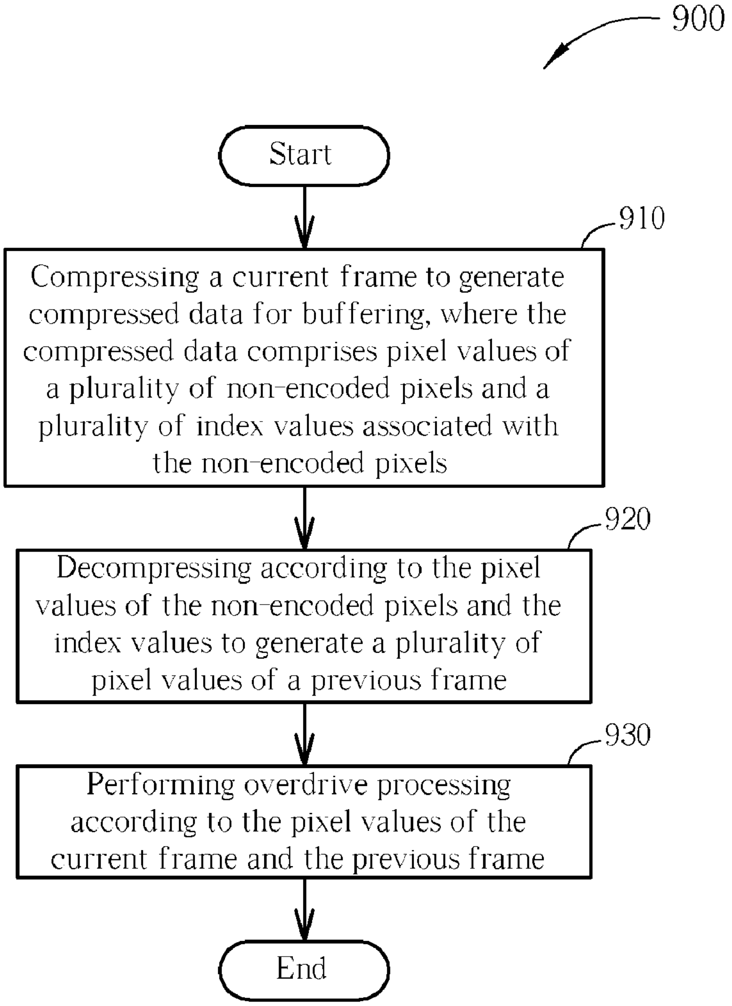
FIG. 7 is a flowchart of a method of compressive overdrive according to an embodiment of the present invention.

FIG. 7 is a flowchart of a compressive overdrive method 900 according to an embodiment of the present invention. In Step 910, a current frame is compressed to generate compressed data for buffering, where the compressed data comprises pixel values of a plurality of non-encoded pixels and a plurality of index values associated with the non-encoded pixels. In Step 920, the current frame is decompressed according to the pixel values of the non-encoded pixels and the index values to generate a plurality of pixel values of a previous frame. In Step 930, the overdrive processing is performed according to the pixel values of the current frame and the previous frame.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A compressive overdrive circuit, comprising:

a compression unit, for compressing a current frame to generate compressed data for buffering, where the compressed data comprises pixel values of a plurality of non-encoded pixels and a plurality of index values associated with the non-encoded pixels; and a decompression unit, for decompressing according to the pixel values of the non-encoded pixels and the index values to generate data of a previous frame;

wherein the overdrive circuit performs overdrive processing according to the current frame and the previous frame.

2. The overdrive circuit of claim 1, wherein the compressed data further comprises a plurality of blending values, and the blending values and the index values are encoded data of a plurality of encoded pixels, and the decompression unit decompresses the encoded data according to the blending values, the pixel values of the non-encoded pixels and the index values.

3. The overdrive circuit of claim 2, wherein each encoded data of each encoded pixel comprises a blending value and two index values; and the decompression unit generates pixel values of the encoded pixels by blending the pixel values of the non-encoded pixels represented by the two index values according to the bending value.

4. The overdrive circuit of claim 3, wherein the two index values are equal and both represent a most resembling pixel neighboring to the encoded pixels.

5. The overdrive circuit of claim 3, wherein the two index values are different and respectively represent a most resembling pixel and a secondary resembling pixel neighboring to the encoded pixels.

6. The overdrive circuit of claim 1, further comprising:

a data transformer, for performing overdrive processing according to the pixel values of the current frame and a plurality of most significant bits of the pixel values of the previous frame.

7. The overdrive circuit of claim 6, further comprising:

two luminance calculators, coupled to the compression unit and the decompression unit respectively and the two luminance calculators both coupled to the data transformer, for calculating luminance for the two frames respectively according to the pixel values of the current frame and the most significant bits of the pixel values of the previous frame to perform overdrive processing.

8. The overdrive circuit of claim 1, further comprising:

a buffer, coupled to the compression unit and the decompression unit, for buffering the compressed data.

9. A method of compressive overdrive, comprising:

compressing a current frame to generate compressed data for buffering, where the compressed data comprises pixel values of a plurality of non-encoded pixels and a plurality of index values associated with the non-encoded pixels;

decompressing according to the pixel values of the non-encoded pixels and the index values to generate data of a previous frame; and performing overdrive processing according to the current frame and the previous frame.

10. The overdrive method of claim 9, wherein the compressed data comprises a plurality of blending values, and the blending values and the index values are encoded data of a plurality of encoded pixels, and the step of decompressing further comprises decompressing according to the blending values, the pixel values of the non-encoded pixels and the index values.

11. The overdrive method of claim 9, wherein each encoded data of each encoded pixel comprises a blending value and two index values; and the decompressing step generates pixel values of the encoded pixels by blending the pixel values of the non-encoded pixels represented by the two index values according to the blending value.

12. The overdrive method of claim 11, wherein the two index values are equal and both represent a most resembling pixel neighboring to the encoded pixels.

13. The overdrive method of claim 11, wherein the two index values are different and respectively represent a most resembling pixel and a secondary resembling pixel neighboring to the encoded pixels.

14. The overdrive method of claim 9, wherein the step of performing overdrive processing further comprises:

performing overdrive processing according to the pixel values of the current frame and a plurality of most significant bits of the pixel values of the previous frame.

15. The overdrive method of claim 9, further comprising:

calculating luminance for the two frames according to the pixel values of the current frame and the most significant bits of the pixel values of the previous frame to perform overdrive processing.

16. The overdrive method of claim 9, further comprising:

buffering the compressed data.

* * * * *